(12) United States Patent
Yamada (10) Patent No.: US 9,858,400 B2
(45) Date of Patent: Jan. 2, 2018

(54) INFORMATION PROCESSING SYSTEM, TERMINAL, AND AUTHENTICATION METHOD

(71) Applicant: Kazuhiro Yamada, Kanagawa (JP)

(72) Inventor: Kazuhiro Yamada, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 176 days.

(21) Appl. No.: 14/483,324

(22) Filed: Sep. 11, 2014

(65) Prior Publication Data

US 2015/0082423 A1    Mar. 19, 2015

(30) Foreign Application Priority Data

Sep. 17, 2013  (JP) .................................. 2013-191370
Aug. 29, 2014  (JP) .................................. 2014-174774

(51) Int. Cl.
*G06F 21/31* (2013.01)
(52) U.S. Cl.
CPC .................................. *G06F 21/31* (2013.01)
(58) Field of Classification Search
CPC ................................. G06F 21/31; G06F 21/45
See application file for complete search history.

(56) References Cited

U.S. PATENT DOCUMENTS

| | | | | |
|---|---|---|---|---|
| 7,051,214 B2* | 5/2006 | Kobayashi | ............... | G06F 21/31 713/183 |
| 7,761,908 B2* | 7/2010 | Yokoyama | ............... | G06F 21/31 709/220 |
| 7,849,320 B2* | 12/2010 | Raikar | .................... | G06F 21/46 713/182 |
| 8,387,134 B2* | 2/2013 | Matsuoka | ............... | G06F 21/31 713/183 |

(Continued)

FOREIGN PATENT DOCUMENTS

| | | | | |
|---|---|---|---|---|
| EP | 2475157 A1 * | 7/2012 | ........ | H04M 3/42178 |
| JP | 4283319 | 6/2009 | | |

(Continued)

*Primary Examiner* — Jason K. Gee
*Assistant Examiner* — Zhimei Zhu
(74) *Attorney, Agent, or Firm* — IPUSA, PLLC (57) ABSTRACT

An information processing system establishes connection between an information storage apparatus and an application installed in a terminal including a storage device for storing authentication information. The information processing system includes a setting information acquisition unit configured to acquire setting information from the information storage apparatus when the terminal receives an execution request to execute the application, the setting information indicating whether to prompt input of the authentication information. The information processing system also includes an authentication process unit configured to display a screen for inputting the authentication information on a display device of the terminal when the setting information acquired by the setting information acquisition unit calls for prompting input of the authentication information, and determine executability of the application when the authentication information that is input via the screen displayed on the display device matches the authentication information that is stored in the storage device.

8 Claims, 11 Drawing Sheets

(56) References Cited

U.S. PATENT DOCUMENTS

| | | | | | |
|---|---|---|---|---|---|
| 2003/0005088 | A1* | 1/2003 | Remer | ............... | H04L 29/06 709/220 |
| 2007/0283011 | A1* | 12/2007 | Rakowski | ......... | H04L 41/0803 709/225 |
| 2012/0254956 | A1* | 10/2012 | Fletcher | ............. | G06F 21/31 726/5 |
| 2014/0344054 | A1* | 11/2014 | Maeda | ............ | G06Q 30/0255 705/14.53 |

FOREIGN PATENT DOCUMENTS

| | | |
|---|---|---|
| JP | 2010-044454 | 2/2010 |
| JP | 2011-118626 | 6/2011 |
| JP | 4781796 | 9/2011 |
| JP | 5047253 | 10/2012 |
| JP | 5047254 | 10/2012 |
| JP | 2014-016897 | 1/2014 |

\* cited by examiner

| SETTING | SETTING RANGE | DEVICE STORING SETTING |
|---|---|---|
| PIN CODE INPUT REQUIREMENT | YES, NO | INFORMATION STORAGE UNIT |
| PIN CODE DIGIT NUMBER | 4~8 | INFORMATION STORAGE UNIT |
| LOCK TIME | NONE, 1, 5, 10, 20 (MIN) | INFORMATION STORAGE UNIT |
| PIN CODE | | SMARTPHONE |

INFORMATION PROCESSING SYSTEM, TERMINAL, AND AUTHENTICATION METHOD

BACKGROUND OF THE INVENTION

1. Field of the Invention

The present invention relates to an information processing system, a terminal, and an authentication method.

2. Description of the Related Art

For example, a technique is known for enabling acquisition of a shared file provided on an internal network from an external network while adequately ensuring security (see e.g. Japanese Laid-Open Patent Publication No. 2011-118626).

Also, a technique is known for preventing leakage of electronic document information that is downloaded to a personal terminal of a user (see e.g. Japanese Laid-Open Patent Publication No. 2010-44454).

Generally, information processing systems for enabling a terminal operated by a user to access information stored in an information storage apparatus are configured to perform access authentication with respect to the terminal and allow the terminal to gain access to information stored in the information storage apparatus after the access authentication is successful.

However, in such information processing systems, when the terminal is lost or loaned to another user after the terminal is successfully authenticated and allowed access to the information storage apparatus, the information stored in the information storage apparatus may be accessed by an unauthorized third party.

Note that the user of the terminal may set up a password such as a PIN code and lock the terminal (device) itself to prevent the information stored in the information storage apparatus from being accessed by an unauthorized third party, for example.

However, conventional information processing systems may require authentication even when the terminal (device) is not attempting to access information stored in the information storage apparatus, and as a result, usability of the terminal may be degraded. Also, in conventional information processing systems, an administrator cannot force users to set up passwords for their terminals.

As described above, in conventional information processing systems, it has been difficult to achieve both information security and usability of the terminal used for accessing/using information stored in the information storage apparatus.

SUMMARY OF THE INVENTION

According to one embodiment of the present invention, an information processing system is provided that establishes connection between an information storage apparatus and an application installed in a terminal including a storage device for storing authentication information. The information processing system includes a setting information acquisition unit configured to acquire setting information from the information storage apparatus when the terminal receives an execution request to execute the application, the setting information indicating whether to prompt input of the authentication information. The information processing system also includes an authentication process unit configured to display a screen for inputting the authentication information on a display device of the terminal when the setting information acquired by the setting information acquisition unit calls for prompting input of the authentication information, and determine executability of the application when the authentication information that is input via the screen displayed on the display device matches the authentication information that is stored in the storage device.

According to an aspect of the present invention, both usability and security may be achieved upon using information stored in an information storage apparatus.

DESCRIPTION OF THE PREFERRED EMBODIMENTS

In the following, embodiments of the present invention are described with reference to the accompanying drawings. Note that a service providing system is described below as an exemplary embodiment of an information processing system of the present invention.

<System Configuration>

Figure 1:
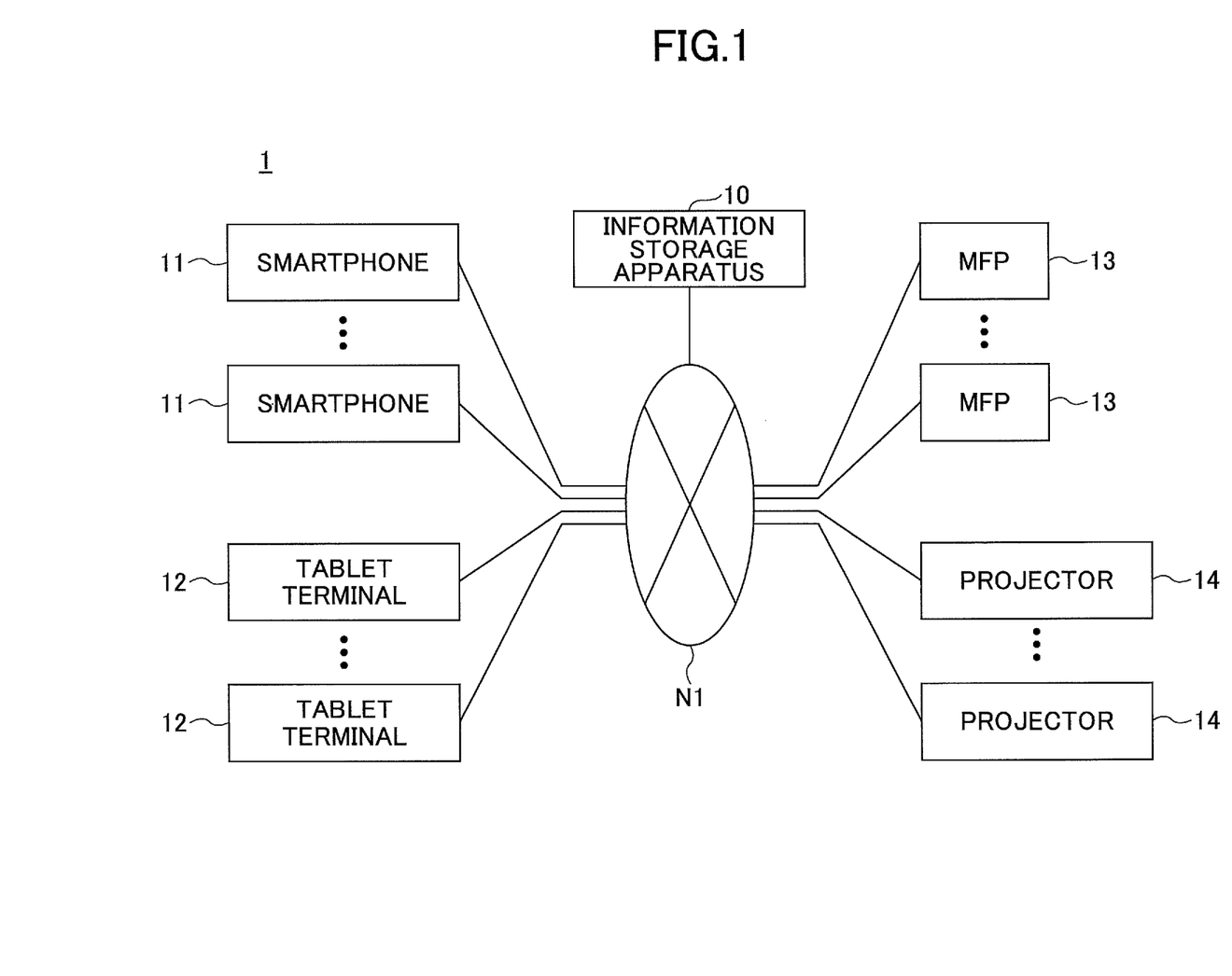
FIG. 1 is a block diagram illustrating an exemplary configuration of a service providing system according to an embodiment of the present invention.

FIG. 1 is a block diagram illustrating an exemplary configuration of a service providing system according to an embodiment of the present invention. In FIG. 1, the service providing system 1 includes an information storage apparatus 10, one or more smartphones 11, one or more tablet terminals 12, one or more MFPs (multifunction peripherals) 13 and one or more projectors 14 that are connected to a network N1 such as a local area network (LAN).

The network N1 may be a network used in a private environment such as an intranet, for example. The smartphones 11 and the tablet terminals 12 are examples of terminals that are carried and operated by users. Such terminals may include not only the above-mentioned smartphones 11 and the tablet terminals 12, but also mobile phones, notebook PCs (personal computers), and other devices that may be operated by users.

The MFPs 13 and the projectors 14 are examples of electronic apparatuses that provide services such as print, scan, and projection, for example. Such electronic apparatuses may include not only the above-mentioned MFPs 13 and the projectors 14, but also printers, scanners, copiers, image display apparatuses, and other apparatuses that are capable of providing services, for example.

The MFPs 13 are examples of image forming apparatuses. The MFPs 13 have image capturing functions, image forming functions, and communication functions, and can be used as printers, facsimile machines, scanners, and copiers, for example. The projectors 14 are examples of image projection apparatuses, and have image projection functions and communication functions.

The information storage apparatus 10 is one example of an information sharing apparatus. The information storage apparatus 10 is configured to carry out sophisticated process operations that the MFPs 13 and the projectors 14 are unable to execute and process operations as a file server. The information storage apparatus 10 may prompt terminals such as the smartphones 11 and the tablet terminals 12 to display information. The information storage apparatus 10 may also cooperate with terminals such as the smartphones 11 and/or the tablet terminals 12 to provide services using electronic apparatuses such as the MFPs 13 and/or the projectors 14. Note that in some embodiments, the information storage apparatus 10 may be configured by a plurality of computers in a decentralized manner, for example.

<Hardware Configuration>

Figure 2:
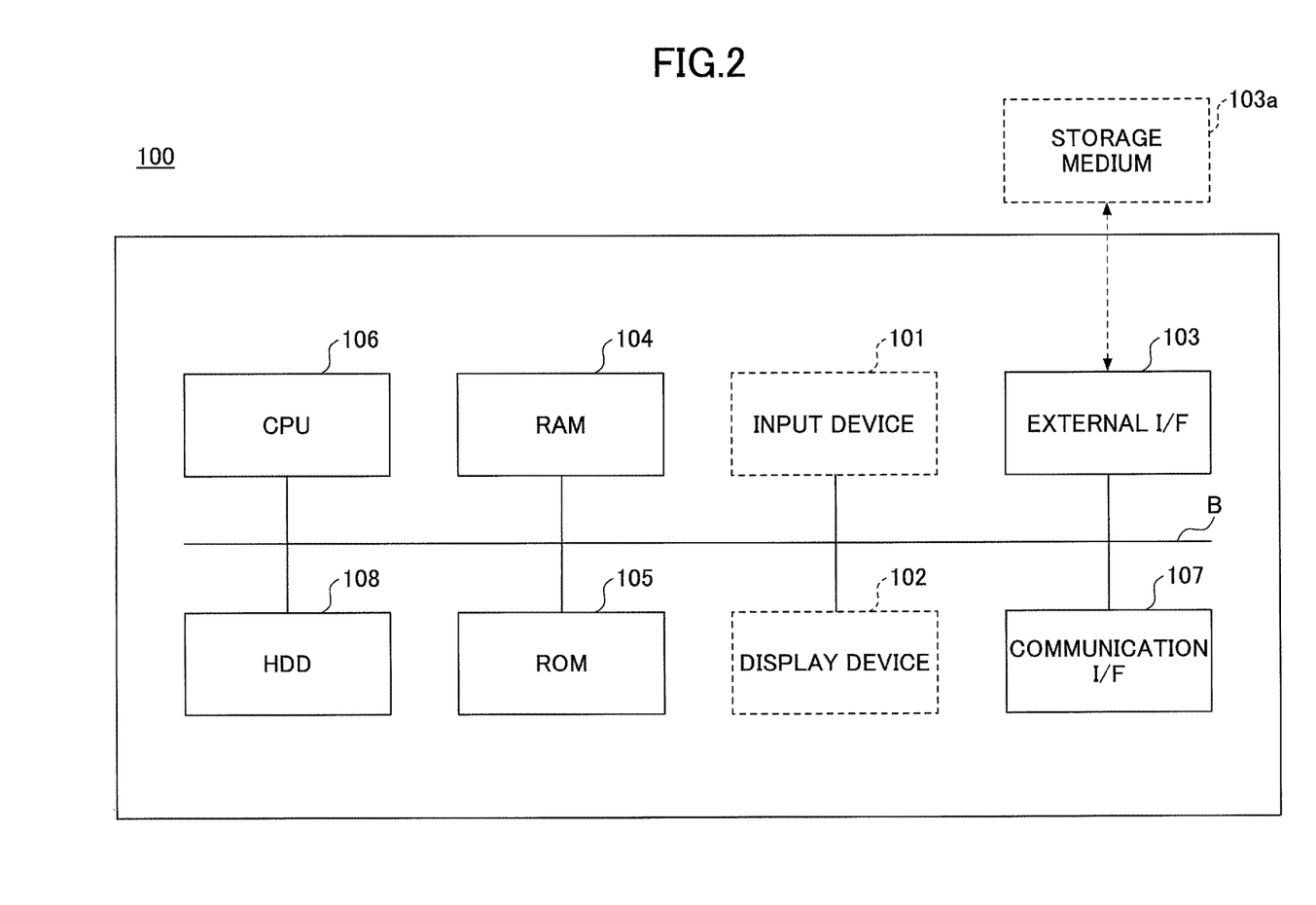
FIG. 2 is a block diagram illustrating an exemplary hardware configuration of a computer system according to an embodiment of the present invention.

The information storage apparatus 10 may be implemented by a computer system 100 having a hardware configuration as illustrated in FIG. 2, for example. Note that the terminals such as the smartphones 11 and the tablet terminals 12 may also include the hardware configuration as illustrated in FIG. 2. FIG. 2 is a block diagram illustrating an exemplary hardware configuration of the computer system 100 of the present embodiment.

In FIG. 2, the computer system 100 includes an input device 101, a display device 102, an external I/F 103, a RAM 104, a ROM 105, a CPU 106, a communication I/F 107, and a hard disk drive (HDD) 108 that are interconnected via a bus B. Note that in some embodiments, the input device 101 and the display device 102 may be connected to the computer system 100 when they need to be used, for example.

The input device 101 may include a keyboard and/or a mouse, for example, and is used to input various operation signals to the computer system 100. The display device 102 may include a display, for example, and is configured to display processing results of the computer system 100. The communication I/F 107 is an interface for connecting the computer system 100 to the network N1. In this way, the computer system 100 may establish data communication with other terminals and electronic apparatuses via the communication I/F 107.

The HDD 108 is a nonvolatile storage device storing programs and data. The programs stored in the HDD 108 may include an operating system (OS) corresponding to basic software controlling overall operations of the computer system 100, and application software providing various functions under the control of the OS, for example. The HDD 108 manages the stored programs and data using a predetermined file system and/or database (DB).

The external I/F 103 is an interface between the computer system 100 and an external device. The external device may be a recording medium 103a, for example. The computer system 100 may have information read from and/or written on the recording medium 103a via the external I/F 103. Note that specific examples of the recording medium 103a include a flexible disk, a compact disk (CD), a digital versatile disk (DVD), a SD memory card, a universal serial bus (USB) memory, and the like.

The ROM 105 is a nonvolatile semiconductor memory (storage device) that can store programs and/or data even when the power is turned off. The ROM 105 stores programs and data such as a basic input/output system (BIOS) to be executed when the computer system 100 is started, OS settings, network settings, and the like. The RAM 104 is a volatile semiconductor memory (storage device) that temporarily stores programs and/or data.

The CPU 106 includes an arithmetic and logic unit that reads a program and/or data from a storage device such as the ROM 105 and/or the HDD 108, loads the program and/or data in the RAM 104, and executes processes according to the program and/or data to control the overall operations and functions of the computer system 100.

The computer system 100 according to the present embodiment may implement various processes described below using the above hardware configuration.

<Software Configuration>

<<Information Storage Apparatus>>

Figure 3:
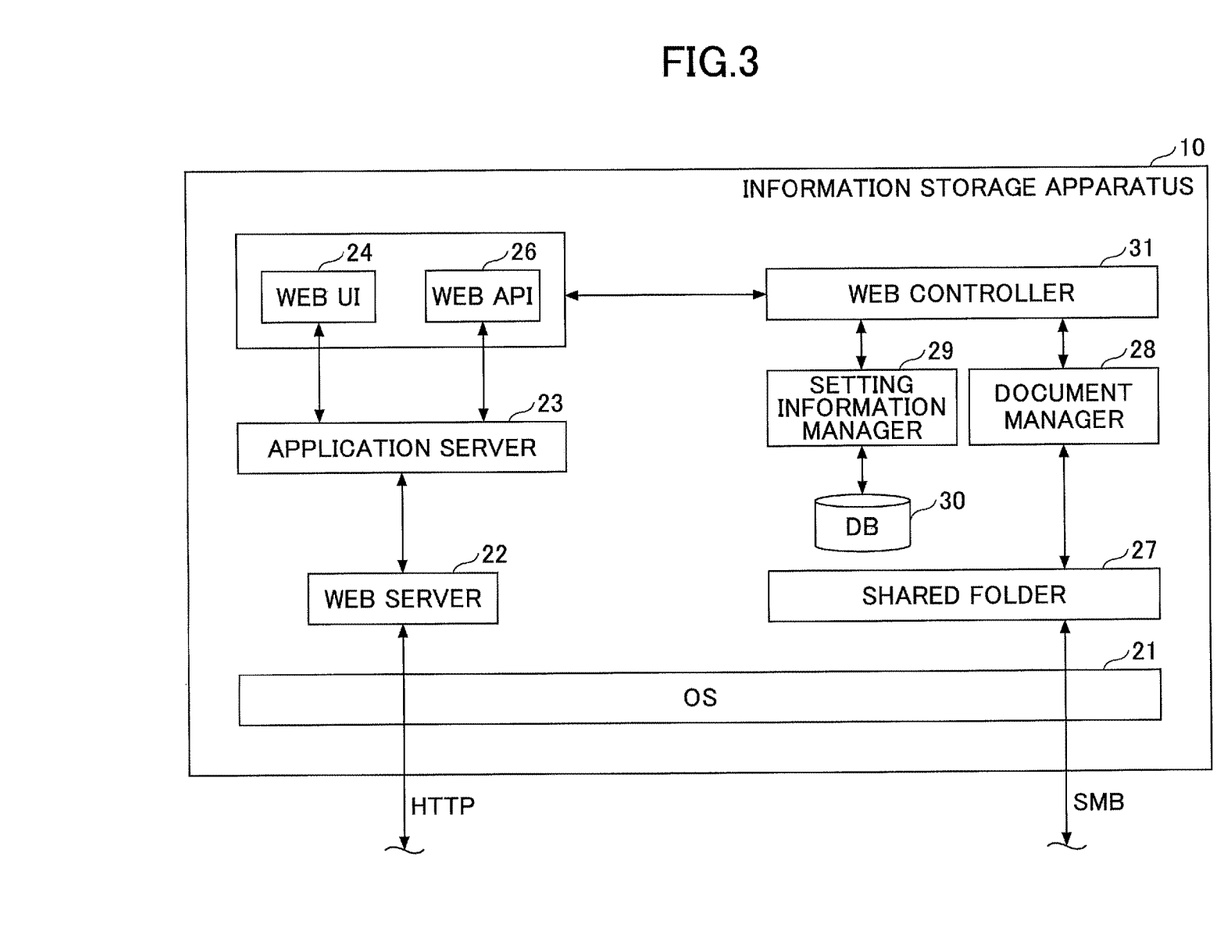
FIG. 3 is a block diagram illustrating an exemplary functional configuration of an information storage apparatus according to an embodiment of the present invention.

The information storage apparatus 10 of the present embodiment may have a functional configuration as illustrated in FIG. 3, for example. FIG. 3 is a block diagram illustrating an exemplary functional configuration of the information storage apparatus 10. The information storage apparatus 10 may execute relevant programs to implement the functions of an OS 21, a web server 22, an application server 23, a web user interface (UI) 24, a web application programming interface (API) 26, a shared folder 27, a document manager 28, a setting information manager 29, a database (DB) 30, and a web controller 31.

The OS 21 is the operating system of the information storage apparatus 10, and controls the overall system of the information storage apparatus 10. The OS 21 may be, for example, Windows (registered trademark), Linux (registered trademark), or the like.

The web server 22 is software for transmitting and receiving information using Hyper Text Transfer Protocol (HTTP). The web server 22 may be, for example, Apache (registered trademark), IIS (registered trademark), or the like.

The application server 23 is software operating as a plug-in of the web server 22, for example. The application server 23 may be, for example, Tomcat (registered trademark) or the like.

The web UI 24 displays a system setting screen in response to a HTTP request. A user may use a web browser (not shown) to change settings via the system setting screen.

The web API 26 can be used via the network N1. The web API 26 receives an HTTP request, executes a process according to the HTTP request, and sends a HTTP response. The web API 26 is a pre-defined interface for receiving requests from terminals such as the smartphone 11 and the tablet terminal 12, and may be configured by functions and/or classes, for example.

Further, the web API 26 of the information storage apparatus 10 may be provided in the form of a software development kit (SDK) to a developer of an application to be installed in a terminal. The developer can thus develop an application using the SDK. The SDK may also be provided to a third vender other than a person providing the information storage apparatus 10. The third vendor can thus develop an application using the SDK. The application developed using the SDK can be installed in a terminal.

By providing the web API 26 of the information storage apparatus 10 as a SDK, a terminal may install not only an application developed by the provider of the information storage apparatus 10 but also an application developed by a third vendor.

The shared folder 27 is a folder published on the network N1 by a server message block (SMB) protocol. A user can access the shared folder 27 using a terminal such as the smartphone 11 or the tablet terminal 12.

The document manager 28 manages files stored in the shared folder 27 and executes data conversion in response to a request from the web controller 31. Note that a file in the present embodiment corresponds to one form of data. The web controller 31 executes processes of controlling the document manager 28 and the setting information manager 29 in response to a request from the web API 26.

The DB 30 stores setting information as described in detail below. The setting information manager 29 manages the setting information stored in the DB 30. Also, the setting information manager 29 provides the setting information stored in the DB 30 to a terminal in response to a setting information acquisition request from the terminal.

Note that process operations of the information storage apparatus 10 may be roughly divided into two processes. That is, one process involves the web server 22, the application server 23, the web UI 24, and the web API 26. The other process involves the shared folder 27, the document manager 28, the setting information manager 29, the DB 30, and the web controller 31. Thus, the web API 26 and the web controller 31 perform inter-process communication.

<<Terminal>>

Figure 4:
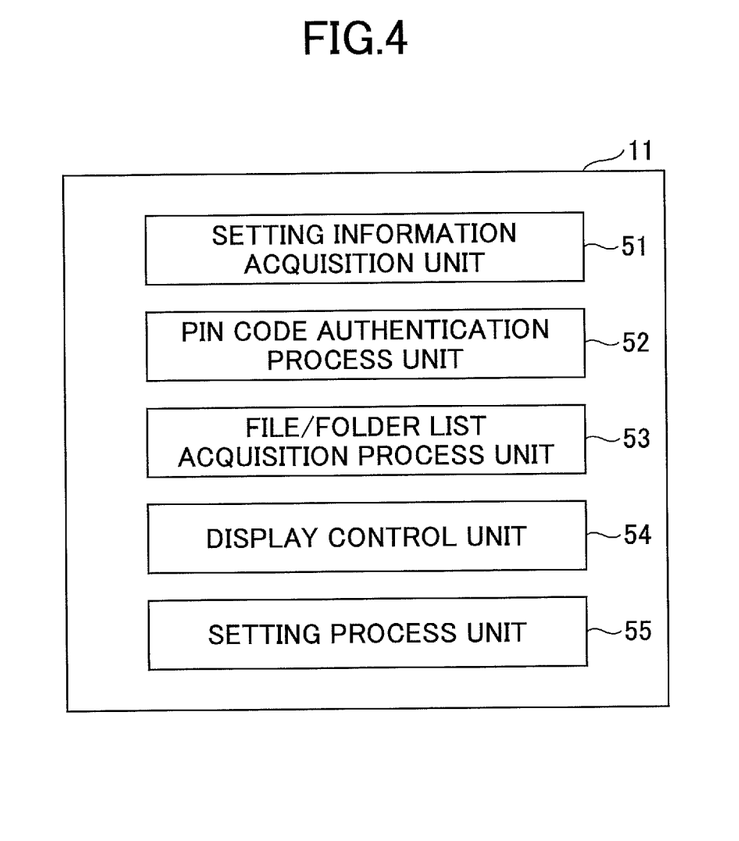
FIG. 4 is a block diagram illustrating an exemplary functional configuration of a smartphone according to an embodiment of the present invention.

In the following, the smartphone 11 is described as an example of a terminal. The smartphone 11 of the present embodiment may have a functional configuration as illustrated in FIG. 4, for example. FIG. 4 is a block diagram illustrating an exemplary functional configuration of the smartphone 11 of the present embodiment.

The smartphone 11 executes an application (app) to implement the functions of a setting information acquisition unit 51, a PIN code authentication process unit 52, a file/folder list acquisition process unit 53, a display control unit 54, and a setting process unit 55.

The setting information acquisition unit 51 acquires setting information from the information storage apparatus 10 at predetermined timings such as when an app is started (app start time). The PIN code authentication process unit 52 performs a PIN code authentication process based on the acquired setting information as described below. The file/folder list acquisition process unit 53 acquires a file/folder list from the information storage apparatus 10 when the PIN code authentication process performed by the PIN code authentication process unit 52 is successful.

The display control unit 54 performs display control operations such as displaying the acquired file/folder list on the display device 102, for example. The setting process unit 55 may accept registration of the information storage apparatus 10 to be accessed by a user via a system setting screen, and register the information storage apparatus 10 if access authentication for the same is successful, for example. Also, the setting process unit 55 may accept setting information set up by an administrator via the system setting screen and request the information storage apparatus 10 to set up the setting information, for example.

<Process Operations>

Figure 5:
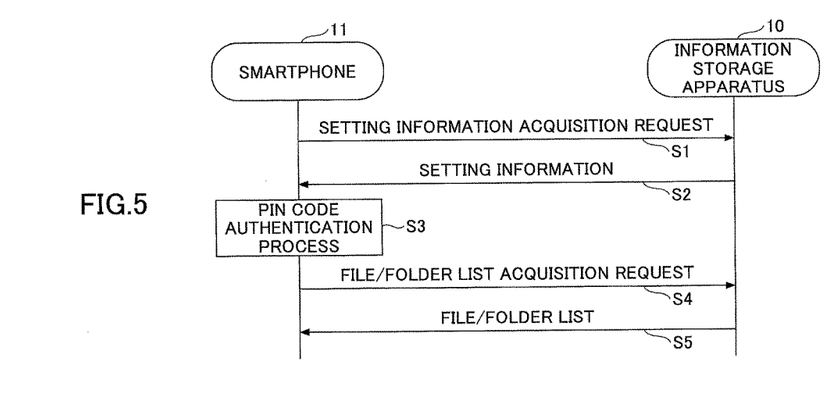
FIG. 5 is a sequence chart illustrating exemplary process operations of the service providing system.

In the following, process operations of the service providing system 1 of the present embodiment are described in greater detail. Note that the exemplary process operations described below relate to a case of using the smartphone 11 to display information on files/folders stored in the information storage apparatus 10 on the smartphone 11. FIG. 5 is a sequence chart illustrating exemplary process steps of the service providing system 1 of the present embodiment.

First, a user operates the smartphone 11, and starts an app for accessing the information storage apparatus 10. Note that the app for accessing the information storage apparatus 10 may be a dedicated app or a general-purpose application having functions added thereto using plug-ins, for example.

Figure 6:
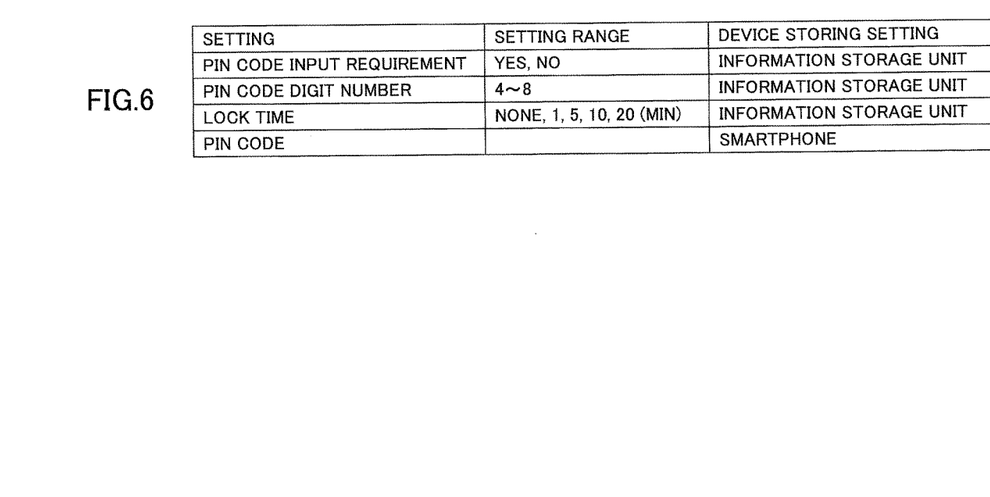
FIG. 6 is a table illustrating exemplary settings used in the service providing system.

When the app is started, in step S1, the setting information acquisition unit 51 of the smartphone 11 sends a setting information acquisition request to the information storage apparatus 10. In step S2, the setting information manager 29 of the information storage apparatus 10 provides the setting information stored in the DB 30 to the smartphone 11. The setting information provided by the setting information manager 29 at this point may include setting information relating to PIN code input requirement, PIN code digit number, and lock time of the settings illustrated in FIG. 6. FIG. 6 is a table listing exemplary settings used in the service providing system of the present embodiment.

The exemplary settings of FIG. 6 include PIN code input requirement, PIN code digit number, lock time, and PIN code. The PIN code input requirement is a setting indicating whether to require input of a PIN code and is stored in the DB 30 of the information storage apparatus 10.

The PIN code digit number is a setting indicating the number of digits of the PIN code and is stored in the DB 30 of the information storage apparatus 10. The lock time is a setting indicating a time period that has to elapse without any operations before an app may be locked. The lock time is also stored in the DB 30 of the information storage apparatus 10. The PIN code corresponds to a PIN code set up by the user operating the smartphone 11 and is stored in the smartphone 11. Note that the timings at which the smartphone 11 acquires the setting information from the information storage apparatus 10 may include the app start time, a wake time of the app from sleep mode, and/or when the app is activated, for example.

Note that in some embodiments, the settings illustrated in FIG. 6 may be stored with respect to each smartphone 11. In this case, in step S1, the smartphone 11 may send identification information for identifying the smartphone 11 to the information storage apparatus 10. The information storage apparatus 10 may read the settings associated with the identification information sent from the smartphone 11. Then, in step S2, the information storage apparatus 10 may send the settings associated with the identification information to the smartphone 11.

In step S3, the PIN code authentication process unit 52 of the smartphone 11 performs a PIN code authentication process based on the setting information received from the information storage apparatus 10. When the authentication process of step S3 is successful, the PIN code authentication process unit 52 of the smartphone 11 determines that the app that has been started may be used. In step S4, the file/folder list acquisition process unit 53 of the smartphone 11 sends a file/folder list acquisition request to the information storage apparatus 10.

Figure 7:
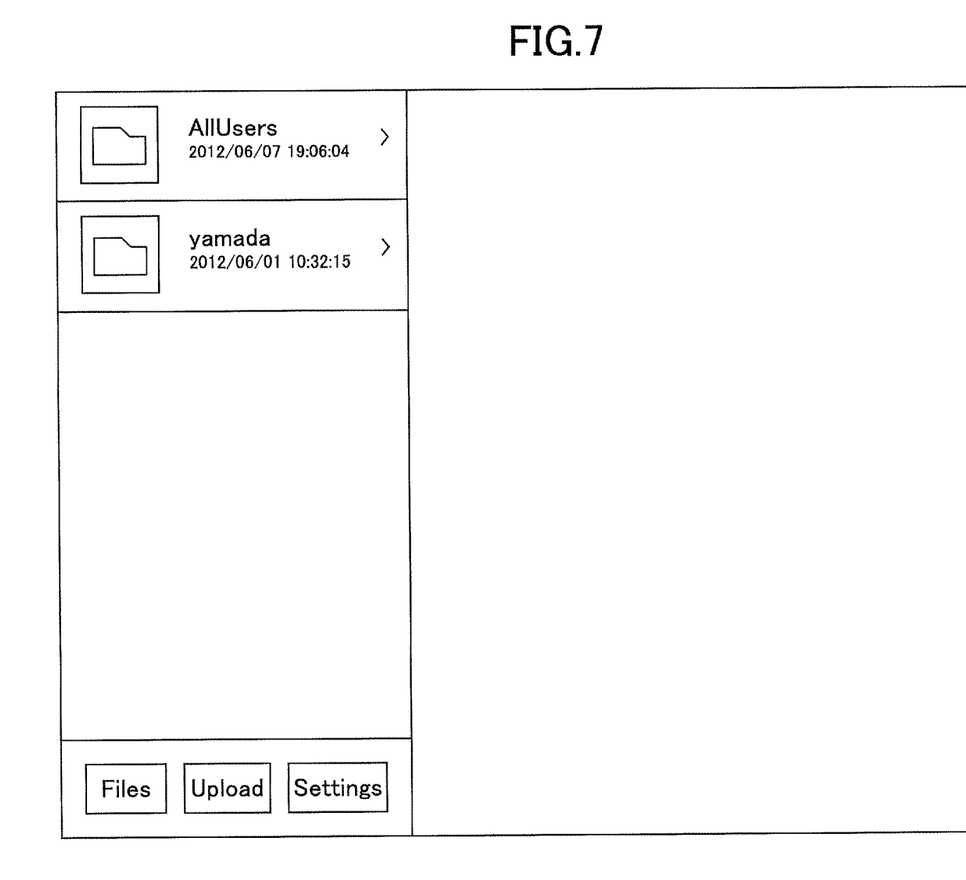
FIG. 7 illustrates an exemplary screen image of a file/folder list screen.

In step S5, the document manager 28 of the information storage apparatus 10 provides a file/folder list stored in the shared folder 27 to the smartphone 11. The display control unit 54 of the smartphone 11 displays the received file/folder list as a file/folder list screen as illustrated in FIG. 7, for example. FIG. 7 illustrates an exemplary screen image of a file/folder list screen. The file/folder list displayed in the file/folder list screen is based on the files and/or folders stored in the information storage apparatus 10.

Figure 8:
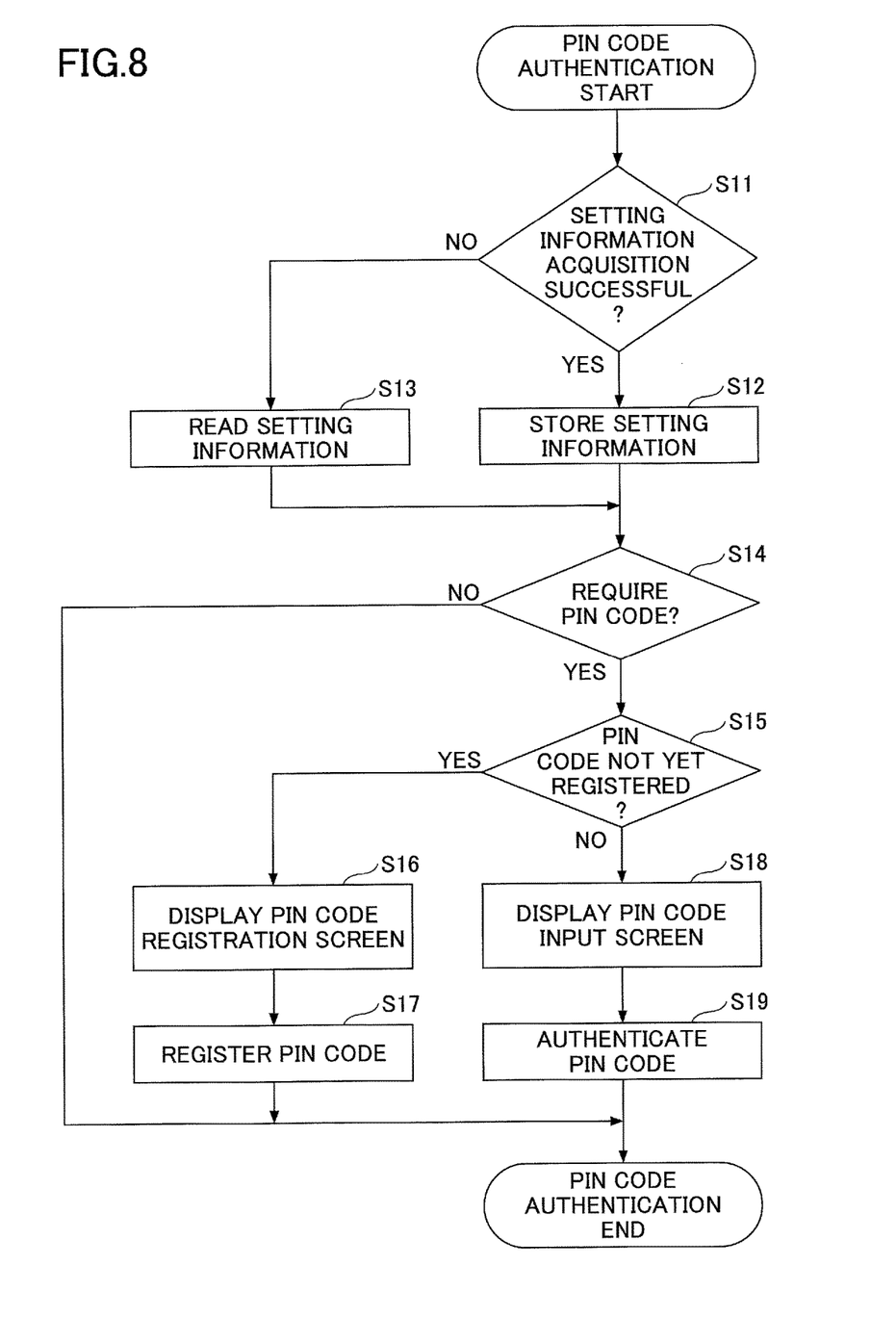
FIG. 8 is a flowchart illustrating exemplary process steps of a PIN code authentication process.

Note that the PIN code authentication process of step S3 may be executed by performing the process steps as illustrated in FIG. 8, for example. FIG. 8 is a flowchart illustrating exemplary process steps of the PIN code authentication process.

In step S11, the setting information acquisition unit 51 of the smartphone 11 determines whether setting information has been acquired from the information storage apparatus 10. If the setting information acquisition unit 51 determines that the setting information has been acquired, the process proceeds to step S12 where the setting information acquisition unit 51 stores the acquired setting information in an internal storage device such as the HDD 108. On the other hand, if the setting information acquisition unit 51 determines that the setting information could not be acquired, the process proceeds to step S13 where the setting information acquisition unit 51 reads previously acquired setting information that is stored in the internal storage device such as the HDD 108.

In step S14, the PIN code authentication process unit 52 refers to the PIN code input requirement setting of the setting information and determines whether a PIN code input is required. If it is determined that a PIN code input is not required, the PIN code authentication process unit 52 of the information storage apparatus 10 ends the PIN code authentication process of FIG. 8. On the other hand, if it is determined that a PIN code input is required, the process proceeds to step S15 where the PIN code authentication process unit 52 determines if a PIN code is not yet registered in the internal storage device such as the HDD 108.

Figure 9:
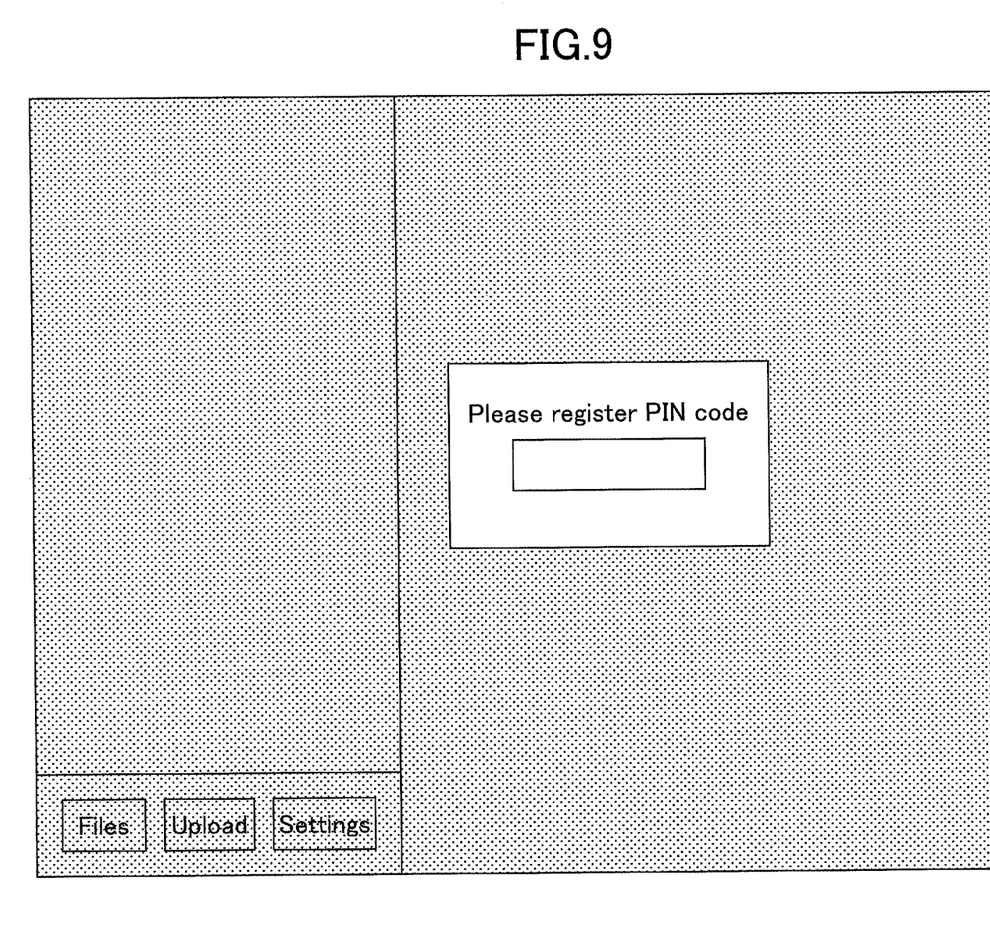
FIG. 9 illustrates an exemplary screen image of a PIN code registration screen.

If a PIN code is not yet registered in the internal storage device such as the HDD 108, the process proceeds to step S16 where the PIN code authentication process unit 52 of the smartphone 11 displays on the display device 102 a PIN code registration screen as illustrated in FIG. 9, for example. FIG. 9 illustrates an exemplary screen image of the PIN code registration screen. In step S17, the user registers a new PIN code in the PIN code registration screen. The PIN code authentication process unit 52 registers the PIN code registered by the user in the internal storage device such as the HDD 108 and ends the PIN code authentication process of FIG. 8.

Figure 10:
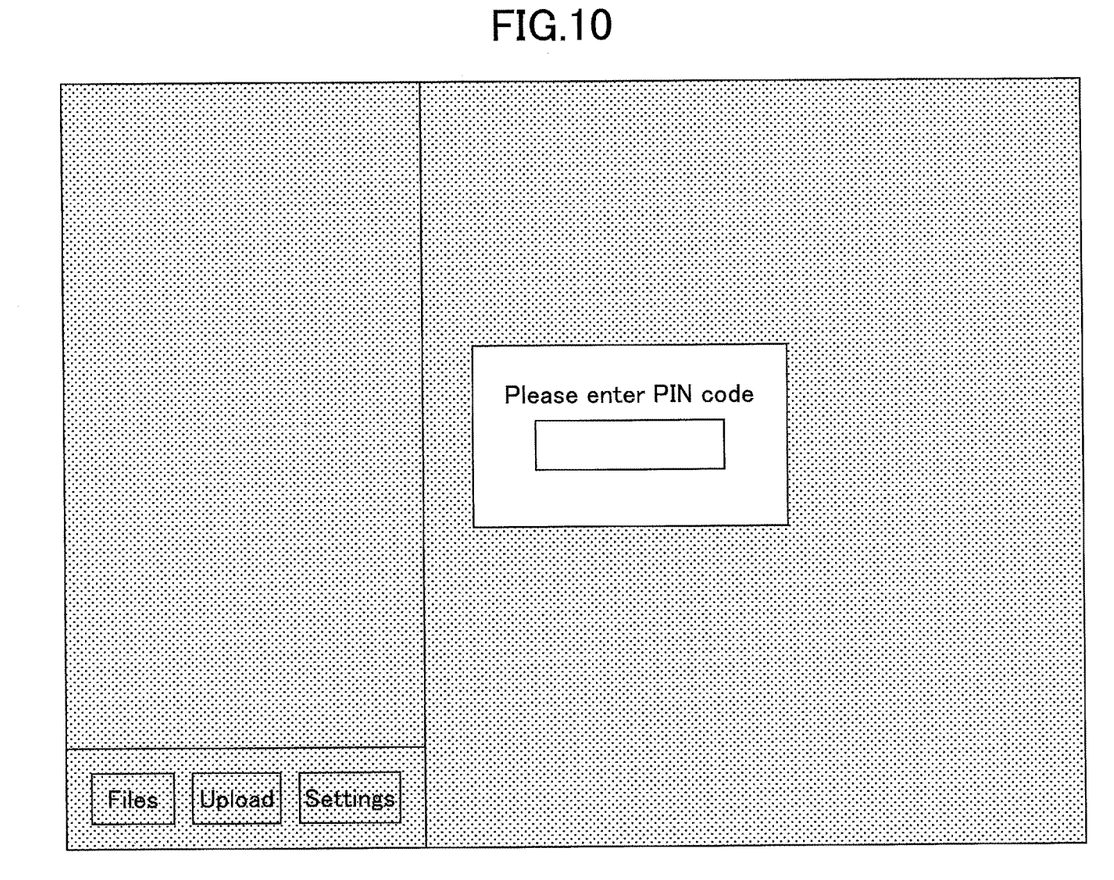
FIG. 10 illustrates an exemplary screen image of a PIN code input screen.

If a PIN code is already registered in the internal storage device such as the HDD 108, the process proceeds to step S18 where the PIN code authentication process unit 52 displays on the display device 102 a PIN code input screen as illustrated in FIG. 10, for example.

FIG. 10 illustrates an exemplary screen image of the PIN code input screen. In step S19, the user enters a PIN code in the PIN code input screen. The PIN code authentication process unit 52 performs PIN code authentication by comparing the PIN code entered by the user and the PIN code registered in the internal storage device such as the HDD 108 and determining whether they match with one another.

If the PIN code entered by the user and the PIN code registered in the internal storage device such as the HDD 108 match with one another, the PIN code authentication process unit 52 determines that the PIN code authentication is successful. On the other hand, if the PIN code entered by the user and the PIN code registered in the internal storage device such as the HDD 108 do not match with one another, the PIN code authentication process unit 52 determines that the PIN code authentication has failed.

Figure 12:
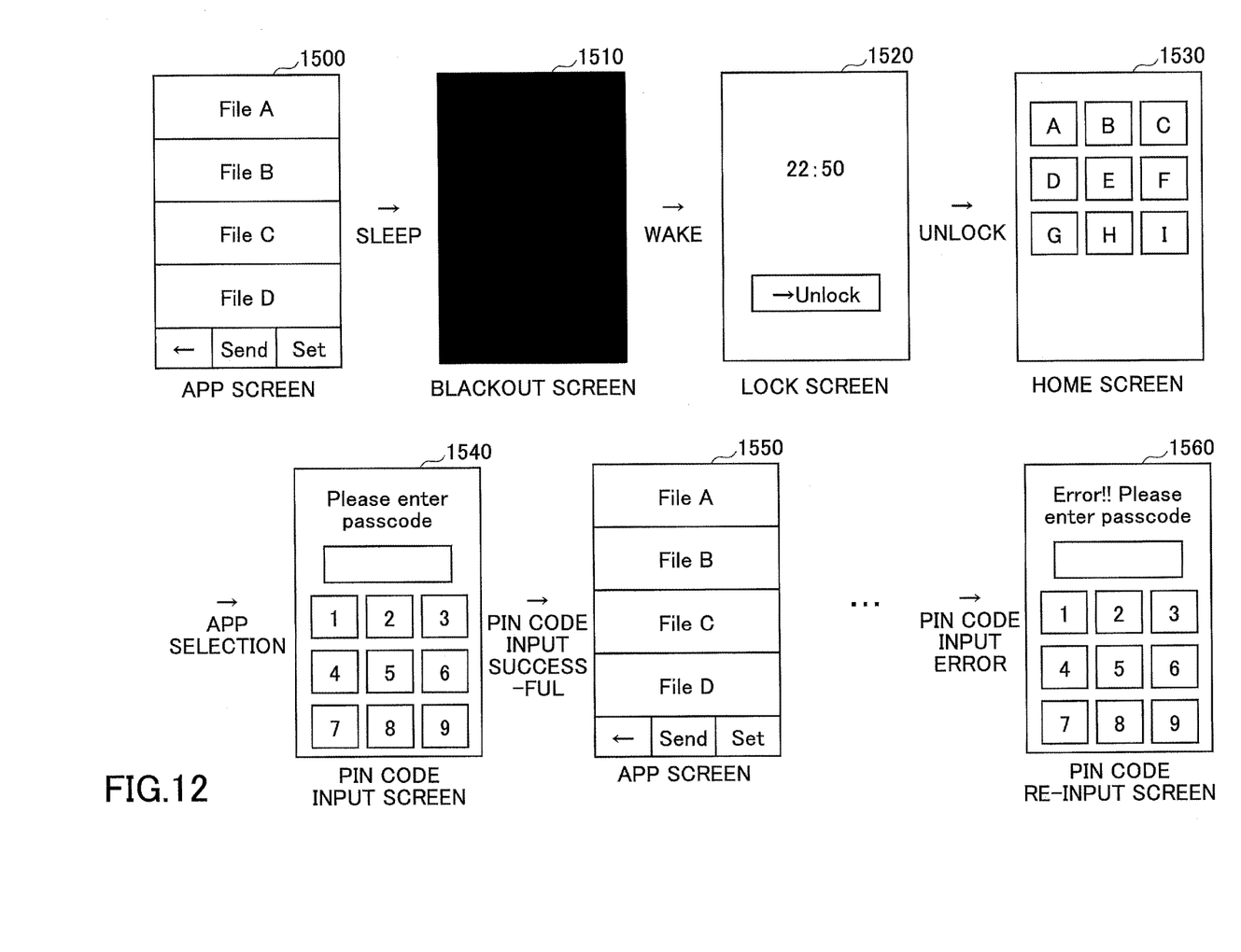
FIG. 12 illustrates exemplary display screens of the smartphone.

In the following, exemplary display screens of the smartphone 11 are described with reference to FIG. 12. FIG. 12 illustrates exemplary display screens of the smartphone 11. An app screen 1500 displayed on the smartphone 11 may be switched to a blackout screen 1510 when the smartphone is temporarily switched to sleep mode.

When the smartphone 11 wakes from sleep mode, the OS of the smartphone 11 may prompt the smartphone 11 to display a lock screen 1520. When the user unlocks the lock screen 1520 of the smartphone 11, the smartphone 11 may display a home screen 1530 that displays an app list, for example. When the user selects a relevant app from the app list being displayed, the smartphone 11 may display a PIN code input screen 1540 for enabling the user to enter a PIN code.

Figure 11:
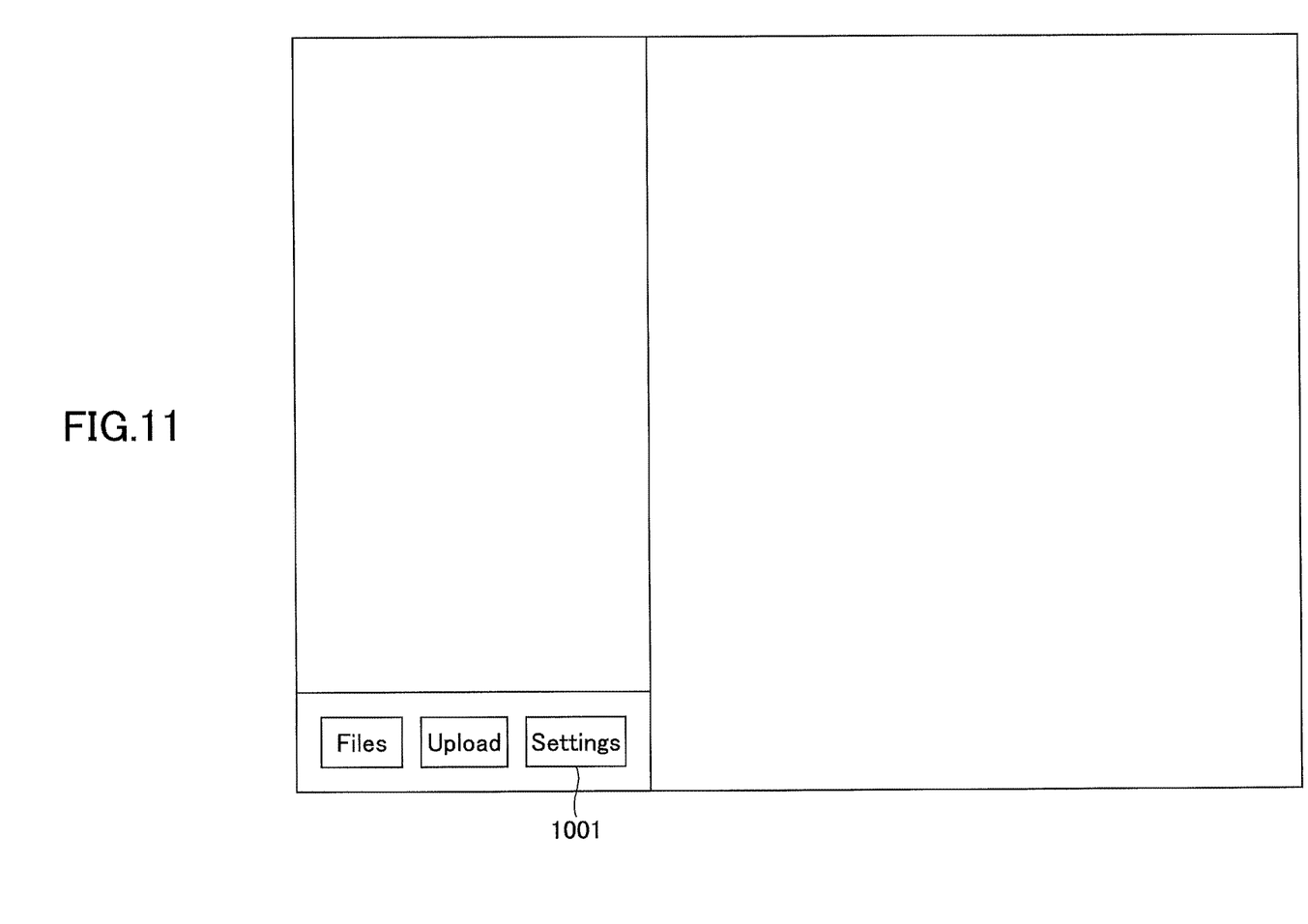
FIG. 11 illustrates an exemplary screen image of a screen displayed when the information storage apparatus cannot be accessed.

After a PIN code is successfully entered, the smartphone 11 may redisplay an app screen 1550. On the other hand, if a PIN code is not successfully entered, the smartphone may display a screen as illustrated in FIG. 11 (described below) or a PIN code re-input screen 1560, for example.

As described above, the smartphone 11 may display the PIN code registration screen or the PIN code input screen based on the PIN code input requirement setting stored in the information storage apparatus 10, and in this way, the smartphone 11 may require a user to perform PIN code authentication. Accordingly, for example, even in a case where a password is not set up for unlocking the lock screen 1520 of FIG. 12, the user may be required to input (register) a PIN code upon starting a relevant app, and in this way, security may be improved.

The administrator of the service providing system 1 may require a user to perform PIN code authentication by setting up the PIN code input requirement setting stored in the information storage apparatus 10 to a setting requiring a PIN code input.

In the service providing system 1 according to the present embodiment, users may be required to perform PIN code authentication, and in this way, security may be improved.

In the service providing system 1 of the present embodiment, a PIN code may be used to implement a password lock on an application for accessing the information storage apparatus 10 rather than the smartphone 11 itself.

By applying a password lock on the application for accessing the information storage apparatus 10, applications of the service providing system 1 of the present embodiment other than that for accessing the information storage apparatus 10 may be prevented from being inconvenienced by a password lock. In this way, the service providing system 1 of the present embodiment may achieve both security and usability upon accessing information in files/folders stored in the information storage apparatus 10, for example.

Further, in the service providing system 1 according to the present embodiment, the PIN code itself is registered in the internal storage device such as the HDD 108 of the smartphone 11. Accordingly, PIN code authentication may be performed to unlock a password lock on an app even when the information storage apparatus 10 cannot be accessed.

In this way, even when the information storage apparatus 10 cannot be accessed, the setting process unit 55 of the smartphone 11 may accept from the user changes and/or setup of setting information of the information storage apparatus 10 that is to be accessed, for example. Also, even when the information storage apparatus 10 cannot be accessed, the display control unit 54 of the smartphone 11 may display a screen as illustrated in FIG. 11, for example, when PIN code authentication is successful. FIG. 11 illustrates an exemplary screen image of a screen that may be displayed on the smartphone 11 when the information storage apparatus 10 cannot be accessed. In FIG. 11, because the information storage apparatus 10 cannot be accessed, a file/folder list such as that displayed in the file/folder list screen of FIG. 7 is not displayed. However, the screen of FIG. 11 includes a "Settings" button 1001 that enables switching to a screen for accepting from the user changes and/or setup of setting information of the information storage apparatus 10 that is to be accessed. The user may press the "Settings" button 1001 to switch a screen display to the screen for changing and/or setting up setting information of the information storage apparatus 10 that is to be accessed.

<Summary>

The service providing system 1 of the present embodiment can require (force) a user to perform PIN code authentication upon operating a terminal such as the smartphone 11 to access (use) information stored in the information storage apparatus 10.

Also, in the service providing system 1 of the present embodiment, a password lock is implemented on an app that is used to access the information storage apparatus 10, and in this way, usability of the terminal may be prevented from being unnecessarily compromised.

Further, in the service providing system 1 of the present embodiment, the PIN code itself is registered in the internal storage device of the terminal. Thus, even when the information storage apparatus 10 cannot be accessed, PIN code authentication may be performed to unlock the password lock on the app.

In this way, the service providing system 1 of the present embodiment may achieve both security of information stored in the information storage apparatus 10 and usability of the terminal when using the information stored in the information storage unit 10.

Although the present invention has been described above with reference to certain illustrative embodiments, the present invention is not limited to these embodiments, and numerous variations and modifications may be made without departing from the scope of the present invention. Note that the PIN code described above is an exemplary embodiment of authentication information of the present invention. The smartphone 11 and the tablet terminal 12 are exemplary embodiments of a terminal.

The present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-191370 filed on Sep. 17, 2013 and Japanese Patent Application No. 2014-174774 filed on Aug. 29, 2014, the entire contents of which are hereby incorporated by reference.

What is claimed is:

1. An information processing system comprising:
an information storage apparatus; and
a terminal that includes
   a memory in which authentication information and an application are stored; and
   a processor that implements processes of:
      sending terminal identification information and a request for setting information to the information storage apparatus upon receiving an execution request to execute the application;
      acquiring, from the information storage apparatus, the setting information associated with the terminal identification information, the setting information indicating whether input of the authentication information is required to execute the application;
      determining whether the authentication information is stored in the memory when the acquired setting information indicates input of the authentication information is required, wherein
         when it is determined that the authentication information is not stored in the memory, the processor implements processes of displaying a registration screen on a display device of the terminal for entering the authentication information, storing the entered authentication information in the memory, and executing the application after the authentication information input to the registration screen is stored in the memory, and
         when it is determined that the authentication information is stored in the memory, the processor implements processes of displaying an input screen on the display device of the terminal for inputting the authentication information, and determining whether to execute the application based on the authentication information entered on the input screen and the authentication information stored in the memory; and
      executing the application upon successful authentication of a user based on the entered authentication information, wherein when it is determined that the information storage apparatus cannot be accessed, the processor implements processes of displaying a screen for accepting user input in relation to setting information of the information storage apparatus.

2. The information processing system as claimed in claim 1, wherein when the application determines that the authentication information is stored in the memory, whereby the processor determines that the application can be executed when the authentication information input via the input screen matches the authentication information stored in the memory.

3. The information processing system as claimed in claim 1, wherein after the setting information is acquired from the information storage apparatus, the processor stores the acquired setting information is stored in the memory; and when the setting information cannot be acquired from the information storage apparatus, the setting information stored in the memory is acquired instead.

4. The information processing system as claimed in claim 1, wherein the application acquires information stored in the information storage from the information storage apparatus and displays the acquired info nation on the display device of the terminal.

5. The information processing system as claimed in claim 1, wherein the acquired setting information further indicates characteristics of the authentication information.

6. The information processing system as claimed in claim 5, wherein the characteristics of the authentication information indicated by the acquired setting information include at least one of a length of the authentication information, and a period of time permitted to elapse before re-input of the authentication information will be requested.

7. A terminal comprising:
a memory;
a processor; and
a display device, wherein
the terminal is connected to an information storage apparatus,
authentication information and an application are stored in the memory, and
the processor implements processes of
receiving an execution request to execute the application stored in the memory,
sending terminal identification information and a request for setting information to the information storage apparatus upon receiving the execution request to execute the application;
acquiring, from the information storage apparatus, the setting information associated with the terminal identification information, the setting information indicating whether input of the authentication information is required to execute the application, and
determining whether the authentication information is stored in the memory when the acquired setting information indicates that input of the authentication information is required, wherein
when it is determined that the authentication information is not stored in the memory, the processor implements processes of displaying a registration screen on the display device for entering the authentication information, storing the entered authentication information in the memory, and executing the application after the authentication information input to the registration screen is stored in the memory;
when it is determined that the authentication information is stored in the memory, the processor implements processes of displaying an input screen on the display device for inputting the authentication information, and determining whether to execute the application based on the authentication information entered on the input screen and the authentication information stored in the memory; and
executing the application upon successful authentication of a user based on the entered authentication information, wherein when it is determined that the information storage apparatus cannot be accessed, the processor implements processes of displaying a screen for accepting user input in relation to setting information of the information storage apparatus.

8. An authentication method that is executed in a terminal that includes a storage device in which authentication information is stored and that is connected to an information storage apparatus, the authentication method comprising:
receiving an execution request to execute an application stored in the information storage apparatus;
sending terminal identification information and a request for setting information to the information storage apparatus upon receiving the execution request to execute the application;
acquiring, from the information storage apparatus, the setting information associated with the terminal identification information, the setting information indicating whether input of the authentication information is required to execute the application;
determining whether the authentication information is stored in the storage device when the acquired setting information indicates input of the authentication information is required, and
displaying a registration screen on a display device of the terminal for entering the authentication information, storing the entered authentication information in the storage device, and executing the application after the authentication information input to the registration screen is stored in the storage device when it is determined that the authentication information is not stored in the storage device, or
displaying an input screen on the display device of the terminal for inputting the authentication information, and determining whether to execute the application based on the authentication information entered on the input screen and the authentication information that is stored in the storage device when it is determined that the authentication information is stored in the storage device; and
executing the application upon successful authentication of a user based on the entered authentication information, wherein when it is determined that the information storage apparatus cannot be accessed, a screen is displayed for accepting user input in relation to setting information of the information storage apparatus.

* * * * *